United States Patent
Proskurin et al.

(10) Patent No.: US 12,505,050 B2
(45) Date of Patent: Dec. 23, 2025

(54) PHYSICAL MEMORY ISOLATION

(71) Applicant: BedRock Systems, Inc., San Francisco, CA (US)

(72) Inventors: Sergej Proskurin, Munich (DE); Sebastian Wolfgang Vogl, Munich (DE); Jonas Pfoh, Radeberg (DE)

(73) Assignee: BLUEROCK SECURITY, INC., San Francisco, CA (US)

( * ) Notice: Subject to any disclaimer, the term of this patent is extended or adjusted under 35 U.S.C. 154(b) by 0 days.

(21) Appl. No.: 18/647,845

(22) Filed: Apr. 26, 2024

(65) Prior Publication Data

US 2024/0362171 A1 Oct. 31, 2024

Related U.S. Application Data (60) Provisional application No. 63/499,179, filed on Apr. 28, 2023.

(51) Int. Cl.
*G06F 12/14* (2006.01)
*G06F 9/455* (2018.01)
*G06F 12/1045* (2016.01)

(52) U.S. Cl.
CPC .......... *G06F 12/1441* (2013.01); *G06F 9/455* (2013.01); *G06F 12/1054* (2013.01); *G06F 12/1458* (2013.01)

(58) Field of Classification Search
CPC ............. G06F 12/1441; G06F 12/1054; G06F 12/1458; G06F 12/109; G06F 12/145;
(Continued)

(56) References Cited

U.S. PATENT DOCUMENTS 10,761,872 B1 9/2020 Lunev et al.
11,188,367 B2 * 11/2021 Patil .................. G06F 21/79
(Continued)

FOREIGN PATENT DOCUMENTS

CN 107368354 A 11/2017
CN 107562515 A 1/2018

OTHER PUBLICATIONS

International Search Report and Written Opinion, PCT App. No. PCT/US2024/026775, Aug. 26, 2024, 09 pages.

*Primary Examiner* — Khoa D Doan
(74) *Attorney, Agent, or Firm* — NICHOLSON DE VOS WEBSTER & ELLIOTT LLP (57) ABSTRACT

Physical memory isolation in a virtualized system is described. A notification is received from a guest in the virtualized system that an address space isolation component has been created in the guest. At the host of the virtualized system, a memory isolation domain that is bound with the address space isolation component is created. The memory isolation domain includes a set of second level address translation tables dedicated for that memory isolation domain. Guest-physical address (GPA) range(s) are received from the guest that are mapped into memory of the guest, and memory access permissions for the GPA range(s) are received and are being mapped for a process into the created memory isolation domain. The host determines whether the mapping for the process into the created memory isolation domain is permitted. If not permitted, the mapping is blocked thereby preventing access. If permitted, the mapping is granted thereby allowing access.

18 Claims, 6 Drawing Sheets

(58) Field of Classification Search
CPC ....... G06F 2212/651; G06F 2212/1052; G06F 2212/151; G06F 2212/657; G06F 9/45558
See application file for complete search history.

(56) References Cited

U.S. PATENT DOCUMENTS

2017/0090966 A1* 3/2017 Gupta ................. G06F 9/45558
2020/0073694 A1* 3/2020 Wallach .............. G06F 9/45558
2020/0073829 A1 3/2020 Tsirkin et al.
2020/0092252 A1* 3/2020 Tillotson ............. H04L 12/4645
2021/0132983 A1 5/2021 Han
2023/0334144 A1* 10/2023 Lin ....................... G06F 21/554

* cited by examiner

PHYSICAL MEMORY ISOLATION

CROSS-REFERENCE TO RELATED APPLICATIONS

This application claims the benefit of U.S. Provisional Application No. 63/499,179, filed Apr. 28, 2023, which is hereby incorporated by reference.

FIELD

Embodiments of the invention relate to the field of virtualization; and more specifically, to physical memory isolation.

BACKGROUND

Virtualization makes it possible for multiple operating systems (OSs) to run concurrently on a single host system without those OSs needing to be aware of the others. The single physical host machine is multiplexed into virtual machines (VMs) on top of which unmodified OSs (referred to as guest OSs) can run. Conventional implementations include a software abstraction layer between the hardware (which may support full virtualization) and the hosted operating system(s). The virtualization layer translates between virtual devices and the physical devices of the platform. In a fully virtualized environment, a guest operating system (OS) can run a virtual machine without any modifications and is typically unaware that it is being virtualized. Paravirtualization is a technique that makes a guest OS aware of its virtualization environment and requires hooks to a guest OS which requires access to its source code, or a binary translation be performed.

Although virtualization relies on hardware support, a software component called a microkernel runs directly on the hardware of the host machine and exposes the VM to the guest OS. The microkernel is typically the most privileged component of the virtual environment. The microkernel abstracts from the underlying hardware platform and isolates components running on top of it. A virtual machine monitor (VMM) manages the interactions between virtual machines and the physical resources of the host system. The VMM exposes an interface that resembles physical hardware to its virtual machine, thereby giving the guest OS the illusion of running on a bare-metal platform. As compared to the microkernel, the VMM is a deprivileged user component whereas the microkernel is a privileged kernel component.

Certain operating systems include constructs to restrict accesses to shared resources that would otherwise be globally available/visible to all processes. For example, Linux implements namespaces including mount namespaces (that isolate the set of filesystem mount points seen by a group of processes), UTS namespaces (that isolate the nodename and domainname system identifiers), IPC namespaces (that isolate interprocess communication (IPC) resources), PID namespaces (that isolate the process ID number space), network namespaces (that provide isolation of the system resources associated with networking), and user namespaces (that isolate the user and group ID number spaces).

There exist conventional ways of isolating memory. One way of isolating memory is to use full VM isolation. However, there can be overhead concerns of using full VM isolation. Another way of isolating memory is using containers such that each container has its own dedicated memory space. Compared to a full VM isolation solution, a container solution provides resource isolation without the need for a full VM and thus requires less overhead. However, these conventional container solutions rely on the kernel to provide isolation. Since all containers share the same kernel, if the kernel is compromised, the isolation of the container can also be compromised.

SUMMARY

In some aspects, the techniques described herein relate to a method for physical memory isolation in a virtualized system, including: receiving a notification from a guest in the virtualized system that an address space isolation component has been created in the guest; creating, at a host of the virtualized system, a memory isolation domain that is bound with the address space isolation component, wherein the memory isolation domain includes a set of second level address translation (SLAT) tables dedicated for that memory isolation domain; receiving, from the guest, a set of one or more guest-physical address (GPA) ranges that are mapped into memory of the guest and receiving memory access permissions to use for the GPA range that is being mapped for a process into the created memory isolation domain, wherein the host maintains multiple memory isolation domains and GPA mappings for each of the memory isolation domains; determining, at the host, whether the mapping for the process into the created memory isolation domain is permitted; responsive to determining that the mapping for the process is not permitted, blocking the mapping thereby preventing access; and responsive to determining that the mapping for the process is permitted, granting the mapping and thereby allowing access.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Providing physical memory isolation for a set of processes and/or containers within a single operating system using memory isolation domains is described. A guest in a virtualized environment causes memory isolation domains to be created. A memory isolation domain restricts access-permissions to the guest-physical memory and prevents processes in one memory isolation domain from modifying memory that is used exclusively by another memory isolation domain.

In an embodiment, the host tracks virtual memory area (VMA) of the guest when implementing the physical memory isolation. The guest creates an address space isolation component in the guest kernel and informs the host of the created address space isolation component. The host creates and maintains a memory isolation domain (e.g., a set of second-level address translation tables) and creates an identifier that binds the created address space isolation component with the created memory isolation domain. The host returns the identifier to the guest. The host collects relevant memory-mapping related information of each process that is in the created address space isolation component. For example, upon creation of a new process, which is uniquely identified by its page table root address, the page table root address and all VMA region information that describes its virtually-contiguous memory region(s), such as the code or data segments (including access permissions) is recorded inside the host. This leads to the following memory isolation hierarchy used in the host: a memory isolation domain includes a set of one or more processes; each such process includes a set of one or more VMA regions; and each such VMA region includes a set of one or more guest-physical address (GPA) ranges. The host populates guest-physical memory mappings on-demand if the operating system uses demand paging. For example, if an access violation occurs within the context of a memory isolation domain, the host accesses the memory mappings to see if the access is valid and will only map the guest-physical address (GPA) if the access is valid. If the guest did not assign a guest-physical address range to the VMA for the process (e.g., because the address range belongs to the kernel or to the data segment of the process), the host receives an access violation (a SLAT violation) when the guest tries to access that range. Because all registered GPA ranges are stored in the host, the host can query that information to get the information about which memory isolation domain, process, and VMA region maps it into memory. By using this previously registered information about authorized VMAs, the host can verify the access attempt (based on the registered access permissions) and can determine how to proceed (e.g., grant, block/log the access attempt). This allows the host to identify unauthorized cross-domain accesses and unauthorized intra-domain accesses. When the guest wants to transition from a first address space isolation component to a second address space isolation component, the guest informs the host of the transition and the host switches to the set of SLAT tables that correspond to the second memory isolation domain.

In another embodiment, the host does not track VMA of the guest when implementing the physical memory isolation. The guest creates an address space isolation component in the guest kernel and informs the host of the created address space isolation component. The host creates and maintains a memory isolation domain (e.g., a set of second-level address translation tables) and creates an identifier that binds the created address space isolation component with the created memory isolation domain. In this embodiment, the following memory isolation hierarchy is used in the host: a memory isolation domain includes a set of one or more processes; and each such process includes a set of one or more guest-physical address (GPA) ranges. In one aspect, the guest uses hypercalls to instruct the host to map guest-physical address ranges when those addresses are mapped into the memory of the guest, and to unmap guest-physical address ranges when those addresses are unmapped from the memory of the guest. In another aspect, the guest indirectly (through traps) maps pages into memory isolation domains for pages that are not marked as "exclusive." If the page is marked as "shared" in a memory isolation domain and has a set of permissions (e.g., (R-X)), another memory isolation domain that does not map that page may be able to access the page with the same (or less) privileges (e.g., (-X)) and cause the host to map it into that memory isolation domain. Each time the guest maps a GPA range, the guest informs the host about which memory access permissions to use for the GPA range that is being mapped for a given process into the memory isolation domain. The host determines whether the mapping is permitted. For instance, given a GPA range that is to be mapped for a memory isolation domain, the host authorizes or permits the memory access under certain circumstances. First, if the host did not yet map the requested GPA range into any memory isolation domain (which means that the memory belongs to the "kernel/system" and is not currently assigned to any memory isolation domain), the host will map the GPA range into the memory isolation domain and mark the GPA range as "exclusive" to the memory isolation domain. Second, if the host has already mapped this GPA range with different permissions inside of the same memory isolation domain, the host grants (and if necessary, extend) the previously granted permissions in this memory isolation domain. Third, if the host has already mapped this GPA range with the same permissions inside a different memory isolation domain, the host will mark the GPA range as "shared" and grant the mapping. The host will block or take other remedial action for all other access/mapping attempts. For instance, the host will not map the GPA range in the SLAT tables. As an example, if the host has already mapped this GPA range with different permissions inside a different memory isolation domain, the host will block the access.

The result is that the system cannot access memory protected by a memory isolation domain without first having to explicitly enter the corresponding memory isolation domain, regardless of whether the access was initiated by user or kernel space, if the system is currently running in a memory isolation domain that is not marked as "shared" and accessed with the same privileges. If a physical page that is marked as "shared" by the host and is mapped as (R-X) in an authorized memory isolation domain, the host can grant access to this memory isolation domain by a process running in another memory isolation domain if the physical memory is accessed by the process with the same (or less) permissions than registered in the shared physical memory page.

In either embodiment, conceptually, this means that while a CPU is operating outside of a memory isolation domain, the physical memory is simply not accessible (conceptually it is as if those memory banks have been temporarily removed from the machine). This means that even with a kernel vulnerability that cannot transition among domains in an undetected way, a malicious actor acting outside of a memory isolation domain has no way of accessing the memory protected by the memory isolation domain.

Figure 1:
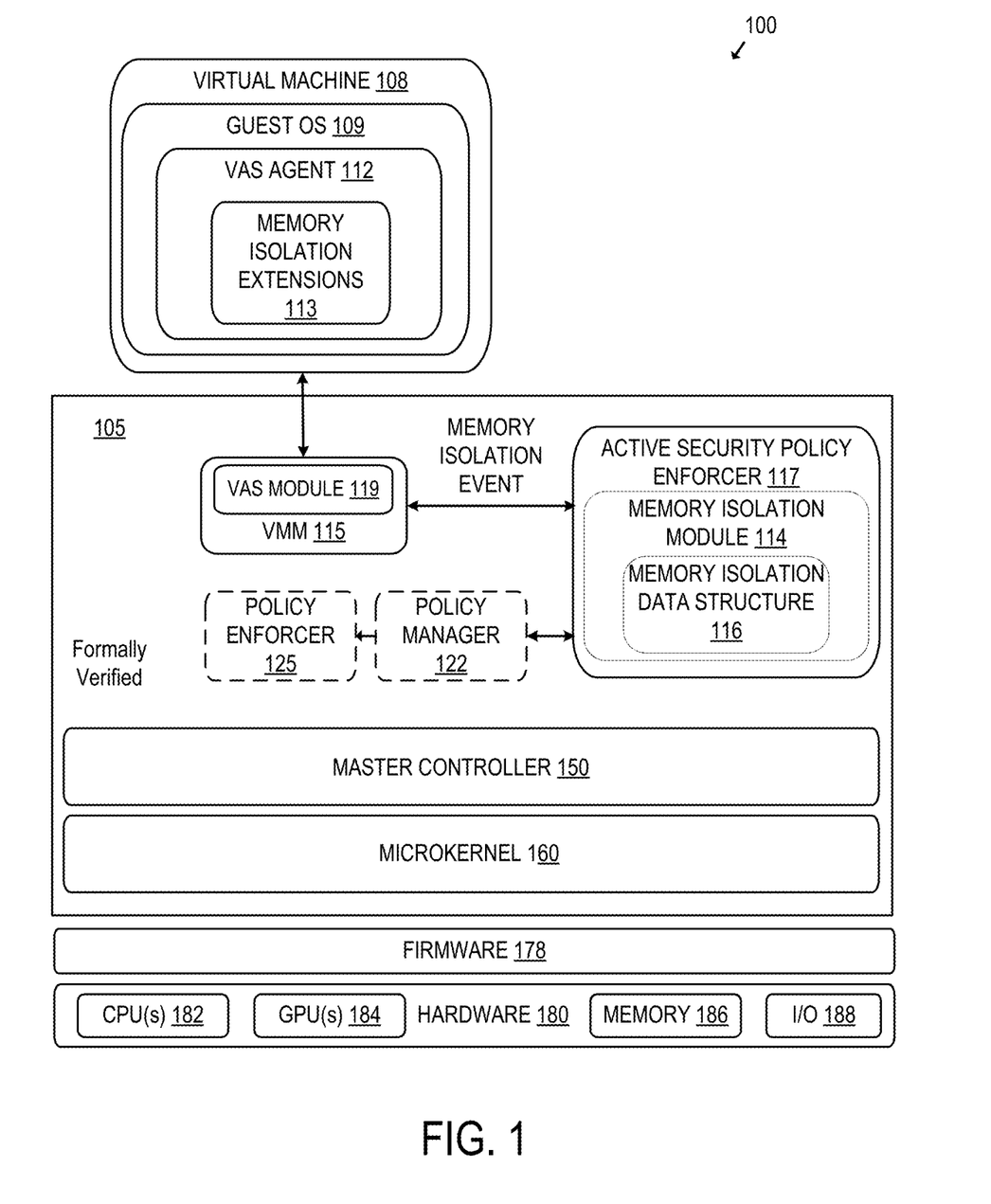
FIG. 1 is a block diagram that illustrates an exemplary architecture for a virtualized system for physical memory isolation according to an embodiment.

FIG. 1 is a block diagram that illustrates an exemplary architecture for a virtualized system for physical memory isolation according to an embodiment. The computing device 100 may be any type of computing device such as a desktop computer, a laptop computer, a server computer, a mobile device such as a smartphone or tablet, a wearable device, a set-top box, a medical computing device, a gaming device, an internet-of-things (IoT) device, or any other computing device that can implement a virtualized system. The computing device 100 executes a hypervisor 105. The computing device 100 uses virtualization-assisted security (VAS). In a VAS system, the guest OS is enlightened (it is aware of the host and its services).

The virtualized system includes a guest operating system 109 that runs on top of the virtual machine 108. The guest OS 109 is modified to include the VAS agent 112 that leverages VAS features implemented in the VAS module 119 included in the VMM 115. The VAS agent 112 prepares the information needed for the VAS module 119 to implement the physical memory isolation features. For instance, the VAS agent 112 includes the memory isolation extensions that allows the kernel of the guest OS 109 to access the physical memory isolation features.

The VMM 115 may run as a user-level application in an address space on top of the microkernel 160 and supports the execution of the guest OS 109 running in the VM 108. The VMM 115 manages the guest-physical memory of its associated virtual machine by mapping a subset of its own address space into the host address space of the VM 108. The VMM 115 can translate the guest virtual addresses to guest physical addresses. The VMM 115 can configure/modify access permissions of individual guest physical addresses in the system's second level address translation tables (slats). The VMM 115 can also map any of its I/O ports and memory-mapped I/O (MMIO) regions into the VM 108 to grant direct access to a hardware device. For example, the VMM 115 creates a dedicated portal for each event type and sets the transfer descriptor in the portals such that the microkernel 160 transmits only the architectural state required for handling the particular event. For example, the VMM 115 configures the portal corresponding to the CPUID instruction with a transfer descriptor that includes only the general-purpose registers, instruction pointer, and instruction length.

The microkernel 160 of the hypervisor 105 may be a lightweight microkernel running at the most privileged level as required by its role to abstract hardware resources (e.g., the CPU) with a minimum interface, and may have less than 10kloc of code. The hardware 180 of the computing device 100 includes one or more central processing units (CPUs) 182, one or more graphics processing units (GPUs) 184, one or more memory units 186 (e.g., volatile memory such as SRAM or DRAM), and one or more input/output devices 188 such as one or more non-volatile storage devices, one or more human interface devices, etc. The hardware components are exemplary and there may be fewer pieces and/or different pieces of hardware included in the system. For instance, the hardware 180 may not include a GPU. Sitting atop the hardware 180 is the firmware 178. The firmware 178 may include CPU microcode, platform BIOS, etc.

The microkernel 160 drives the interrupt controllers of the computing device 100 and a scheduling timer. The microkernel 160 also controls the memory-management unit (MMU) and input-output memory-management unit (IOMMU) if available on the computing device 100. The microkernel 160 may implement a capability-based interface. A capability is a reference to a resource, plus associated auxiliary data such as access permissions. A null capability does not refer to anything and carries no permissions. An object capability is stored in the object space of a protection domain and refers to a kernel object. A protection domain object capability refers to a protection domain. An execution context object capability refers to an execution context. A scheduling context object capability refers to a scheduling context. A portal object capability refers to a portal. A semaphore object capability refers to a semaphore. A memory object capability is stored in the memory space of a protection domain. An I/O object capability is stored in the I/O port space of a protection domain and refers to an I/O port. A guest space capability refers to a guest space.

Running on top of the microkernel 160 are multiple hyper-processes. Each hyper-process runs as a separate protected and microkernel 160 enforced memory and process space, outside of the privilege level of the microkernel 160. In an embodiment, each hyper-process is formally verified. Some of these hyper-processes communicate with the microkernel 160 such as the master controller 150. The master controller 150 controls the operation of the virtualization such as memory allocation, execution time allotment, virtual machine creation, and/or inter-process communication.

Active security with policy enforcement may be performed by the virtualized system according to an embodiment. For instance, physical memory isolation in the virtualized system may be performed. As shown in FIG. 1, the active security and policy enforcement may be performed in coordination with the policy manager 122 and one or more policy enforcers such as the active security policy enforcer 117 and policy enforcer 125. An active security policy enforces the behavior of a guest OS or guest application. Example active security policies include: physical memory isolation, process credential protection, process allowance, process denial, driver allowance, driver denial, directory allowance, directory denial, file type allowance, file type denial, I/O device allowance, I/O device denial, limiting the number of writes to a particular register and/or limiting the values that can be in a particular register, and protecting a memory page (e.g., limiting writes or reads to specific memory pages, ensuring the memory is not executed). The physical memory isolation is described in greater detail herein. As an example, a physical memory isolation policy may determine whether an authorized access (e.g., across memory isolation domains) is to be logged or blocked. As another example, a physical memory isolation policy may provide option(s) to apply to other structures such as to kernel data structures.

The active security policy enforcer 117 includes the memory isolation module 114. The memory isolation module 114 provides for physical memory isolation for a set of processes and/or containers through use of memory isolation domains within a single operating system. The memory isolation module 114 maintains data structure(s) for the physical memory isolation. For example, the memory isolation data structure 116 is used for the memory isolation. The memory isolation data structure 116 typically is multiple data structures that interact. In an embodiment where the host tracks VMA of the guest, the memory isolation data structure 116 includes GVA mappings. In an embodiment where the host does not track VMA of the guest, the memory isolation data structure 116 does not include GVA mappings.

Figure 2:
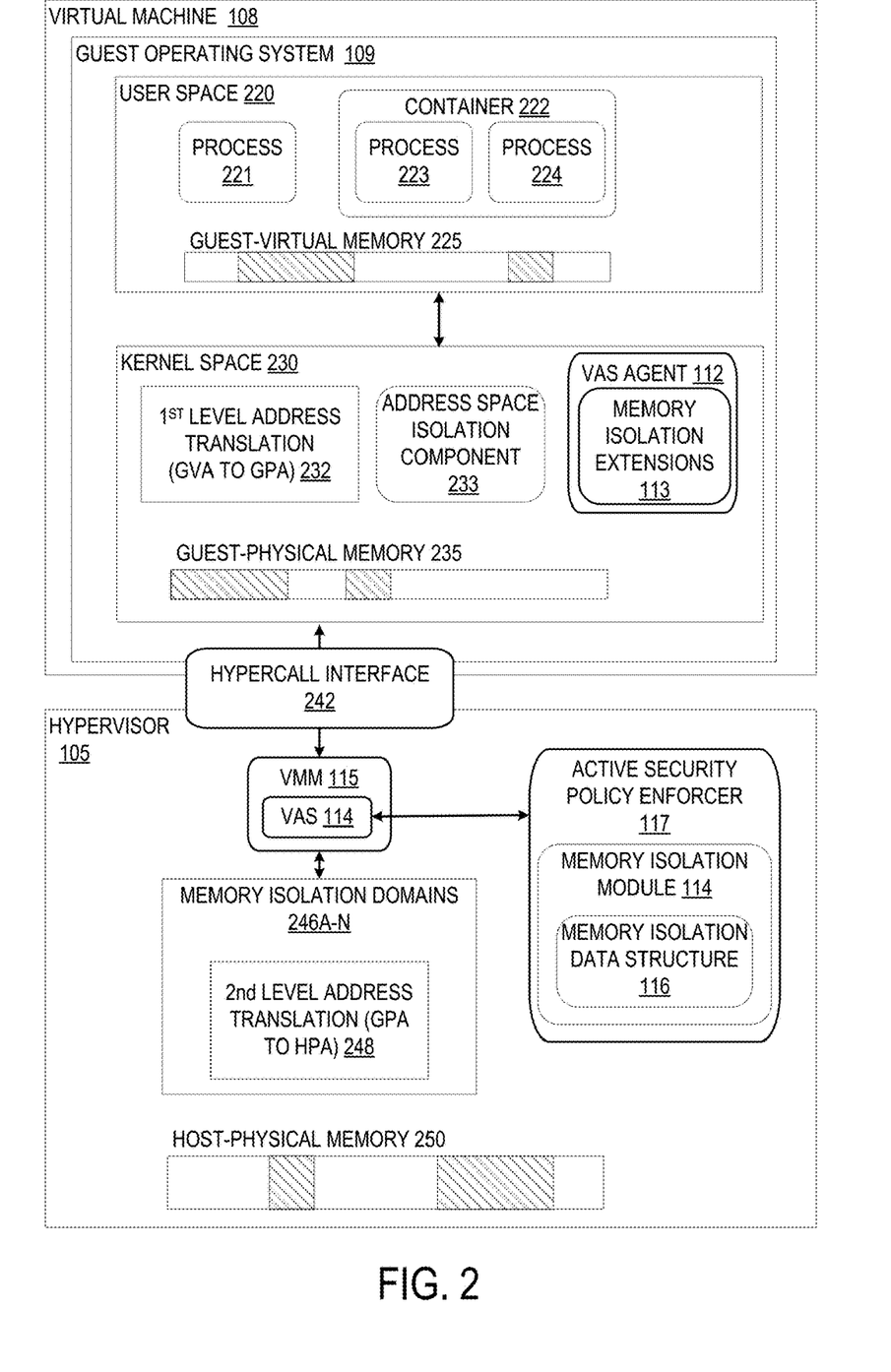
FIG. 2 shows an example of physical memory isolation for a set of processes and/or containers within a single operating system using memory isolation domains according to an embodiment.

FIG. 2 shows an example of physical memory isolation for a set of processes and/or containers within a single operating system using memory isolation domains according to an embodiment. The guest OS 109 includes the user space 220 and the kernel space 230. The user space 220 is where user applications and user-level processes execute. As illustrated in FIG. 2, the user space 220 shows the process 221, process 223, and the process 224 executing. The process 223 and the process 224 execute within the container 222. The user space 220 includes the guest-virtual memory 225. The kernel space 230 is where the kernel of the guest operating system 109 resides. The kernel space 230 includes a first level address translation 232 that translates between the guest-virtual memory 225 and the guest-physical memory 235. The kernel space 230 includes the address space isolation component 233 that is used for isolating the view of globally available memory. There are typically multiple address space isolation components where each address space isolation component is bound with a set of one or more processes. If the guest operating system 109 is a Linux operating system, the address space isolation component 233 may be a new kind of namespace that is referred herein as a memory namespace. A system call facilitates communication between the kernel and user space within the guest OS 109.

The memory isolation extensions 113 of the VAS agent 112 provides the ability for the kernel of the guest OS 109 to create the memory isolation domains 246A-N in the host and control which parts of the guest-physical memory the VMM 115 places into one of the memory isolation domains 246A-N. The memory isolation extensions 113 also provide the ability for the guest OS 109 kernel to transition between memory isolation domains 246A-N. A memory isolation domain is represented by a set of guest-physical memory page frames/ranges that are to be protected by the associated domain. A memory isolation domain includes a set of second-level address translation (SLAT) tables represented by the SLAT 248 in FIG. 2. The SLAT 248 translates guest-physical addresses to host-physical addresses of the host-physical memory 250.

The memory isolation domain restricts or limits the view on the guest-physical memory. In an embodiment, a memory isolation domain (e.g., SLAT) does not map the guest-physical memory that belongs to other processes in another memory isolation domain. In another embodiment, a memory isolation domain does not map the guest-physical memory that belongs to another process in another memory isolation domain except for code pages and/or data pages that are explicitly shared among the memory isolation domains (e.g., libraries). A memory isolation domain does, however, prevent processes in a first memory isolation domain from modifying memory that is used exclusively by a second memory isolation domain. A guest-physical page may be marked as "exclusive" to a particular memory isolation domain by granting write permissions to that guest-physical page. Thus, the memory isolation domains constrains user-space processes and the kernel activity that executes in the context of the restricted processes in such a way that processes in different memory isolation domains are not able to manipulate the memory of each other, even if one of the processes is vulnerable to attack and manages to abuse a kernel vulnerability.

Each process that is launched is either placed into an existing address space isolation component 233 or a new address space isolation component 233. A new address space isolation component may be triggered by a clone( )function. For example, each time a new process is created, flags may be provided to clone( ) to allocate a new address space isolation component. If the intention is to place an existing process into an existing address space isolation component, a setns function can be used to reassociate the existing process into an existing address space isolation component. If the intention is to place an existing process into a new address space isolation component, an unshare function can be used to reassociate the existing process into a new address space isolation component.

In an embodiment, each time the guest reports the creation of an address space isolation component 233, the host creates an empty memory isolation domain (including creating an empty SLAT). In an embodiment where the host tracks VMA of the guest, the guest reports memory mappings to the host at some point in time. Any time a second level pagetable (SLP) violation occurs within the context of a memory isolation domain, the host consults the memory mappings to see if the access is valid and will only map in memory if a mapping exists. In an embodiment where the host does not track VMA of the guest, the guest informs the host about which memory access permissions to use for a GPA range that is being mapped for a given process into a given memory isolation domain. The host then decides whether the mapping is permitted.

On a transition from one address space isolation component to another address space isolation component, the guest informs the host. The host can switch between memory isolation domains on a per-vCPU basis such that other vCPUs are not affected. For example, the host can switch to the set of SLAT tables that correspond to the previous memory isolation domain to the set of SLAT tables that correspond to the new memory isolation domain.

Figure 3A:
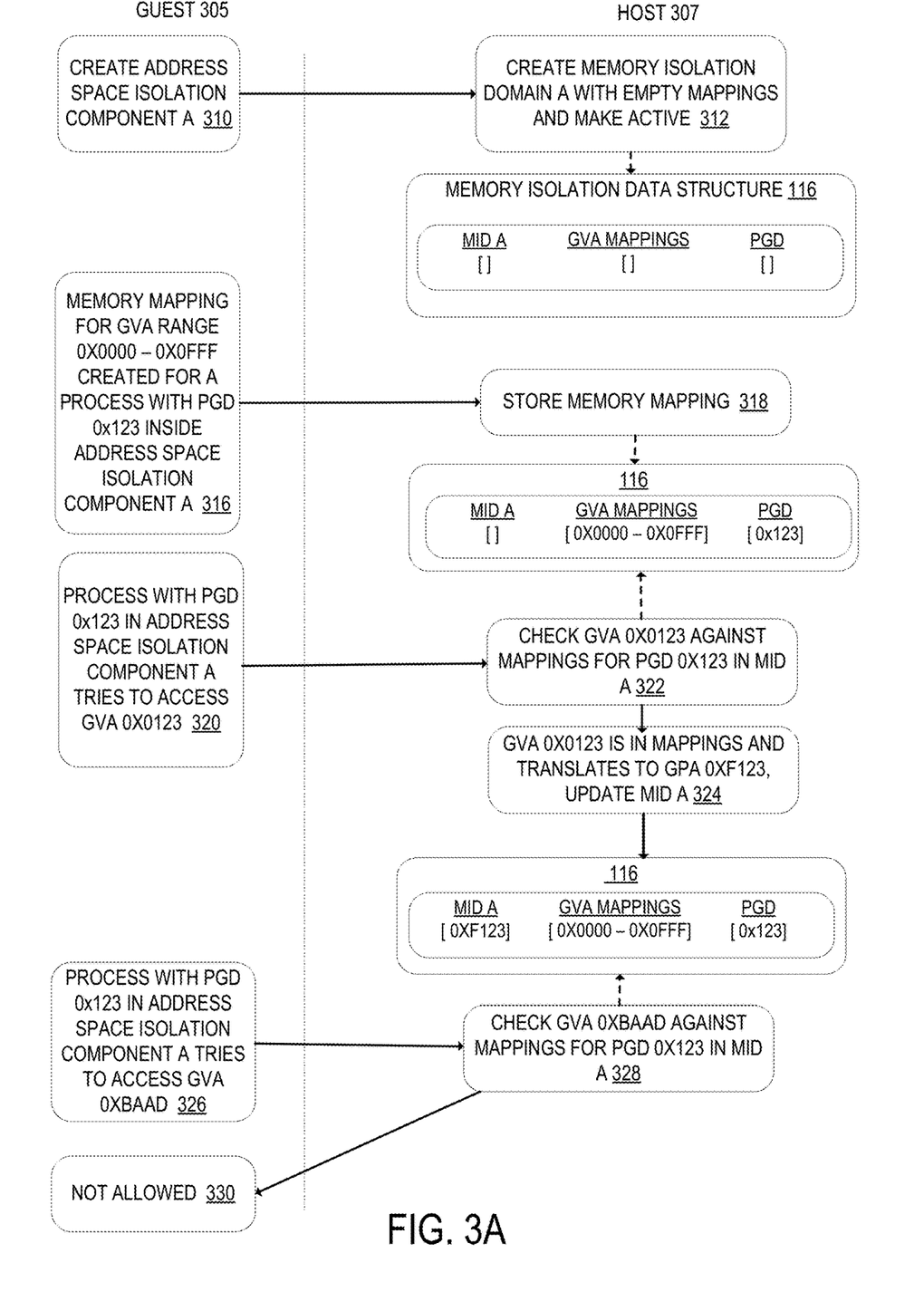
FIG. 3A illustrates a first portion of interaction between the guest OS and the host for physical memory isolation for establishing and using a new memory isolation domain according to an embodiment.
Figure 3B:
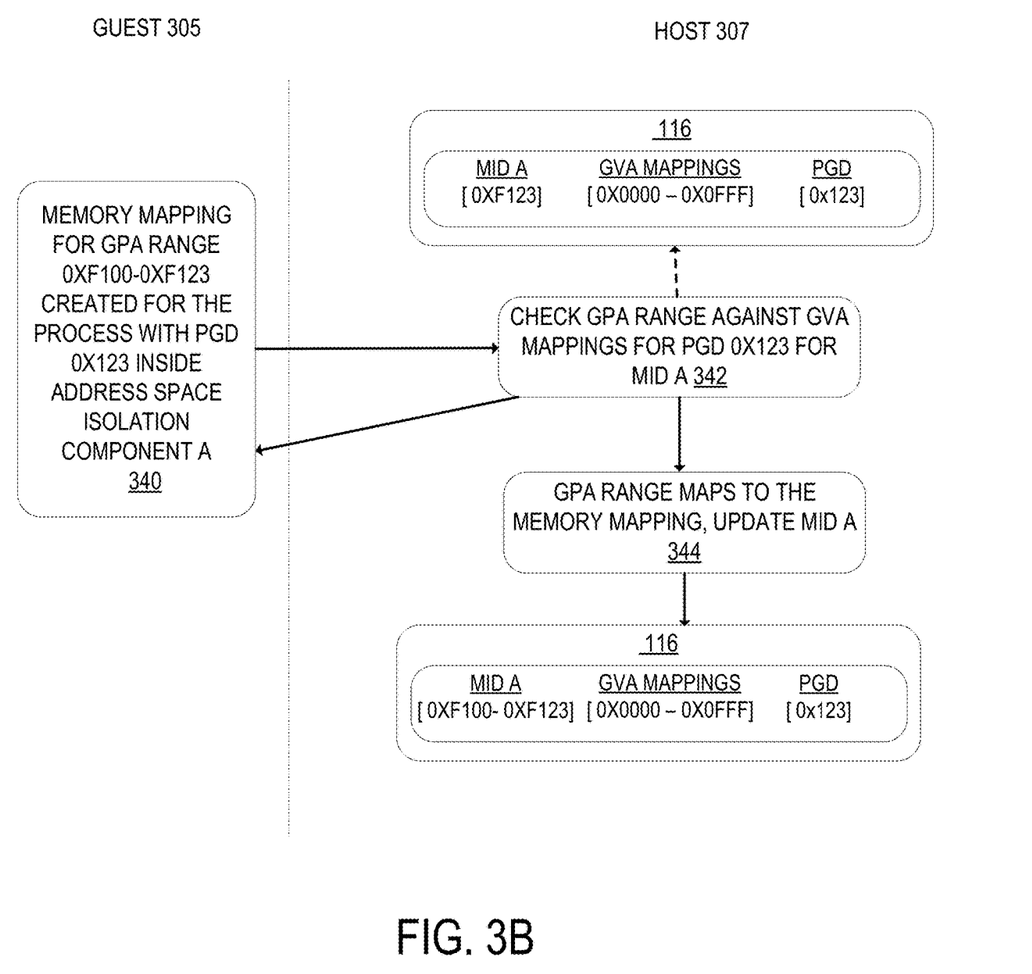
FIG. 3B illustrates a second portion of interaction between the guest OS and the host for physical memory isolation for establishing and using a new memory isolation domain according to an embodiment.

FIGS. 3A and 3B illustrates the interaction between the guest OS and the host for physical memory isolation for establishing and using a new memory isolation domain according to an embodiment. In the embodiment shown in FIGS. 3A-B, the host tracks VMA of the guest. The operations of the guest described in FIGS. 3A-B can be performed using the memory isolation extensions 113. If a user launches a new user-space process (e.g., via an exec( ) family of functions), the kernel identifies the underlying file and uses its information to setup an initial virtual memory area (VMA) map that describes the individual segments of the binary to be executed. Each VMA region describes a virtually contiguous segment and its memory access permissions. Thus, the kernel establishes and maintains a virtual memory map in the form of a set of VMA regions that fully describe the virtual address space of the process. Some operating systems, such as Linux, use those VMA areas during its lazy paging strategy (sometimes referred to as demand paging) to identify whether the faulting address is an address that should be mapped into the address space of the process or in case the faulting address is not part of any VMA region, to segfault. For example, after the kernel identifies the requested file's contents and reads the respective contents into memory it will eventually map them into the (initially empty) virtual address space of the process in question. In the example shown in FIG. 3A, the memory mapping is lazily populated.

The guest 305 creates an address space isolation component A at operation 310. The address space isolation component A may be created because of a clone function being executed. The guest 305 communicates the creation of the address space isolation component A to the host 307. The guest 305 may use the hypercall interface 242 to communicate the creation of the address space isolation component A. For instance, the hypercall may inform the host 307 that an address space isolation component is created.

The host 307 in turn creates a memory isolation domain A with empty mappings and makes the memory isolation domain A active at operation 312. Thus, at this time and as shown in FIG. 3A, the memory isolation data structure 116 includes the memory isolation domain A as empty (e.g., SLAT), the guest-virtual address (VMA) mappings as empty, and the PGD as empty. The PGD represents the page table root address that identifies a particular process. The memory isolation data structure 116 supports multiple processes running in the same memory isolation domain with overlapping VMAs. Although a single data structure is shown, the memory isolation data structure 116 may be multiple data structures that interact to provide the functionality.

Creating the memory isolation domain A includes allocation of a new SLAT for the memory isolation domain, which is initially empty with the exception that the VMM can partially populate the SLAT with mappings that are required by the hardware (e.g., MMIO regions). Although not shown in FIG. 3A, the host 307 returns to the guest 305 an identifier of the created memory isolation domain that binds the address space isolation component A and the memory isolation domain A. The identifier is used by the guest 305 to identify the memory isolation domain A in subsequent communications. If the allocation of a new memory isolation domain fails (e.g., the system does not have enough memory), the host 307 returns an error back to the guest 305.

Sometime later at operation 316, the guest 305 communicates a memory mapping for the guest-virtual address range created for a process inside the address space isolation component A. In this example, the memory mapping is for the GVA range 0x0000-0x0fff for a process with a PGD 0x123. The guest 305 may use the hypercall interface 242 to communicate the GVA range created for the process to the host 307. The host 307 stores the received range for the process in the address space isolation component A at operation 318. At this time, the memory isolation data structure 116 includes the memory isolation domain A (SLAT) as empty, the guest-virtual address (VMA) mappings as the received range, and the PGD as 0x123.

The execution (or data access) attempt of the pages corresponding to the guest-virtual addresses is interrupted because the underlying memory isolation domain A is empty. If an access violation occurs on a guest-virtual address for the address space isolation component A that is not included within the guest-virtual address range(s) for the address space isolation component A, then no guest-physical address mapping will occur and a violation exists. To say it another way, if the guest-virtual address for the attempted access is not within the VMA map, then an entry in the SLAT for the memory isolation domain is not created and a violation occurs. If an access violation occurs on a guest-virtual address for address space isolation component A that is included within the guest-virtual address range(s) for the address space isolation component A, then a mapping to a guest-physical address is done for the memory isolation domain A. To say it another way, if the guest-virtual address for the attempted access is within the VMA map, then an entry in the SLAT for the memory access domain is created. Referring to the figure, sometime later at operation 320, a process with the PGD 0x123 in the address space isolation component A tries to access the guest virtual address 0x0123, which is within the GVA range 0x0000-0x0fff. Because the guest virtual address 0x0123 is not currently within the memory isolation domain A (the SLAT for the memory isolation domain A is currently empty at the time of this access violation), an access violation occurs. The host 307 (e.g., the memory isolation module 114) checks, at operation 322, whether the faulting guest virtual address (0x0123) corresponds to the GVA mappings for the given process for the memory isolation domain A. In this example, the host 307 determines that the faulting guest virtual address (0x0123) is within the range of the GVA mappings for process with the PGD 0x123 inside the memory isolation domain A. The faulting guest virtual address translates to a guest-physical address of 0xf123. The host 307 updates the mapping for the memory isolation domain A at operation 324 (e.g., creates an entry in the SLAT for the memory isolation domain A). Thus, at this time, the memory isolation data structure 116 includes the memory isolation domain A (SLAT) including 0xF123, the guest-virtual address (VMA) mappings as 0x0000-0x0FFF, and the PGD as 0x123.

Sometime later at operation 326, the process with the PGD 0x123 in the address space isolation component A tries to access the guest virtual address 0xbaad, which is not within the GVA range 0x0000-0x0fff. Because the guest virtual address 0xbaad is not currently within the address space isolation component A, an access violation occurs. The host 307 (e.g., the memory isolation module 114) checks, at operation 328, whether the faulting guest virtual address (0xbaad) corresponds to the GVA mappings for the given process for the memory isolation domain A. Since it is not, no entry in the SLAT for the memory isolation domain A for the corresponding guest-physical address is created and the access is not allowed at operation 330.

In an embodiment, the guest can communicate to the host of guest-physical address mappings explicitly (e.g., through a hypercall). For example, the guest may use a hypercall through the hypercall interface 242 to instruct the host to map the GPA range(s) for a given process (identified with a PGD) into its memory isolation domain. The guest may also use a hypercall through the hypercall interface 242 to communicate memory access permissions to use for the GPA range. Thus, at operation 340, the guest 305 communicates a memory mapping for the guest-physical address range 0xF100-0xF123 created for process with PGD 0x123 inside the address space isolation component A. The guest 305 may also communicate memory access permissions to use for that GPA range. The host 307, at operation 342, checks the GPA range against the GVA mappings for the PGD 0x123 in the memory isolation data structure 116. In the example of FIG. 3B, the translations of the GVA mappings 0x0000-0x0FFF for the PGD 0x123 in the memory isolation domain A contains the GPA range 0xF000-0xF123. To say it another way, the GVA mappings 0x0000-0x0FFF for the PGD 0x123 in the memory isolation domain A maps to the GPA range 0xF000-0xF123. Thus, at operation 344, the GPA range maps to the memory mapping and the host 307 updates the mapping for the memory isolation domain A (e.g., updates the SLAT for the given process in the memory isolation domain A to include the GPA range). Thus, at this time, the memory isolation data structure 116 includes the memory isolation domain A (SLAT) including 0xF100-0xF123, the guest-virtual address (VMA) mappings as 0x0000-0x0FFF, and the PGD as 0x123.

The operations of FIGS. 3A-3B show that the system cannot access memory isolated by a memory isolation domain without first explicitly entering the corresponding domain (regardless of whether the access is initiated by user or kernel space). Any access to pages that translate to protected guest-physical page frames will trap into the memory isolation module 114, which will then check whether the process in the currently active memory isolation domain has the necessary privileges to access the page frame in question. If the process in the memory isolation domain has the necessary privileges to access the page frame in question, the memory isolation module 114 grants the access. If, however, the process in the memory isolation domain does not have the necessary privileges to access the page frame in question, the memory isolation module 114 can take remedial action(s) (e.g., report a violation and/or block the access).

When the guest wants to transition from a first address space isolation component to a second address space isolation component, the guest informs the host of the transition and the host switches to the set of SLAT tables that correspond to the second memory isolation domain (after validating the switch). A transition typically occurs in in a process context switch. The guest may report this transition through the hypercall interface 242 and provide the identifiers of the memory isolation domains.

Figure 4:
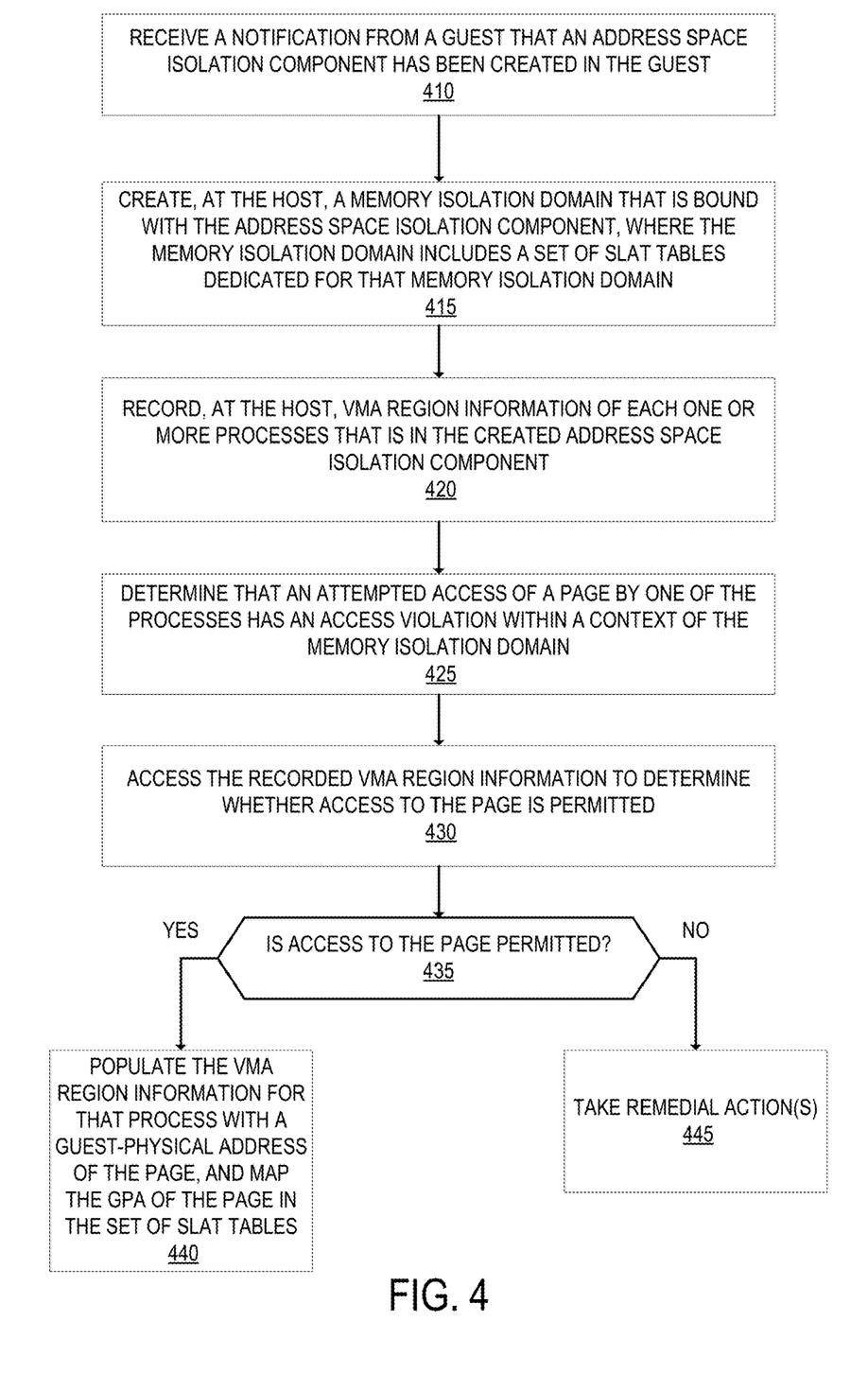
FIG. 4 is a flow diagram that illustrates exemplary operations for performing physical memory isolation according to an embodiment.

FIG. 4 is a flow diagram that illustrates exemplary operations for performing physical memory isolation according to an embodiment. The operations of FIG. 4 are described with respect to the exemplary embodiment of FIGS. 1 and 2. However, the exemplary embodiments of FIGS. 1 and 2 can perform operations different from the operations of FIG. 4, and the operations of FIG. 4 can be performed by embodiments different from the embodiments of FIGS. 1 and 2. In the operations of FIG. 4, the host tracks VMA of the guest.

At operation 410, the host receives a notification from the guest in the virtualized system that an address space isolation component has been created in the guest. For example, the kernel of the guest operating system 109 creates an address space isolation component 233 and communicates the creation of the address space isolation component 233 to the host that is received at the memory isolation module 114. The communication may be a hypercall using the hypercall interface 242 and may identify the created address space isolation component 233. The kernel of the guest may create the address space isolation component 233 responsive to a fork function being executed with flags to indicate the allocation of the address space isolation component.

Next, at operation 415, the host of the virtualized system creates a memory isolation domain 246 (e.g., the VMM 115 creates a memory isolation domain 246) that is bound with the created address space isolation component 233. The memory isolation domain 246 includes a set of SLAT tables dedicated for that memory isolation domain 246. The set of SLAT tables may be initially empty with the exception that the VMM 115 may partially populate the SLAT tables with mappings that are required by the hardware (e.g., MMIO regions). The host may also return an identifier of the memory isolation domain 246 to the guest. This identifier can be used by the guest to identify the memory isolation domain 246 in subsequent communications.

Next, at operation 420, the host records VMA region information of each process that is in the created address space isolation component 233. The VMA region information may include access permissions. For example, upon creation of a new process, which is uniquely identified by its page table root address, the page table root address and all VMA region information that describes its virtually-contiguous memory region(s), such as the code or data segments (including access permissions) is recorded inside the host. The host typically includes multiple data structures for recording this information.

Next, at operation 425, the host determines that an attempted access of a page by one of the set of processes has an access violation within a context of the memory isolation domain. This may occur if there is not a guest-physical address mapping corresponding to the page. Because the host stores all registered GPA ranges, the host can determine whether the access is valid. At operation 430, the host accesses the recorded VMA region information to determine whether access to the page is permitted. The host can query the registered information to get the information about which memory isolation domain, process, and VMA region maps into memory. By using this previously registered information about authorized VMAs, the host can verify the access attempt (based on the registered access permissions) and can determine how to proceed (e.g., grant, block/log the access attempt). Thus, at operation 435, the host determines whether access to the page is permitted. If access to the page is permitted, then at operation 440 the host populates the VMA region information for that process with a guest-physical address of the page and maps the guest-physical address of the page in the set of SLAT tables. If access to the page is not permitted, then at operation 445 the host takes one or more remedial actions (e.g., block and/or log the access attempt).

As described earlier, in an embodiment the host does not track VMA of the guest when implementing the physical memory isolation. In such an embodiment, the guest informs the host explicitly (via hypercalls) or indirectly (via traps) the guest-physical address (GPA) ranges that are to be mapped in the host for a given process into a given memory isolation domain, and informs the host the memory access permissions to use for the GPA range. The host then determines whether the mapping is permitted.

FIG. 4 describes an example where a guest-physical address is mapped due to an access violation. In an embodiment, the guest can communicate to the host a range of guest-physical address mappings explicitly (e.g., through a hypercall). For example, the guest may use a hypercall through the hypercall interface 242 to instruct the host to map the GPA range(s) for a given process (identified with a PGD) into its memory isolation domain. The guest may also use a hypercall through the hypercall interface 242 to communicate memory access permissions to use for the GPA range. The host validates whether the mapping of the guest-physical address range is valid, and if is, then it can populate the VMA mapping and update the set of SLAT tables accordingly.

Figure 5:
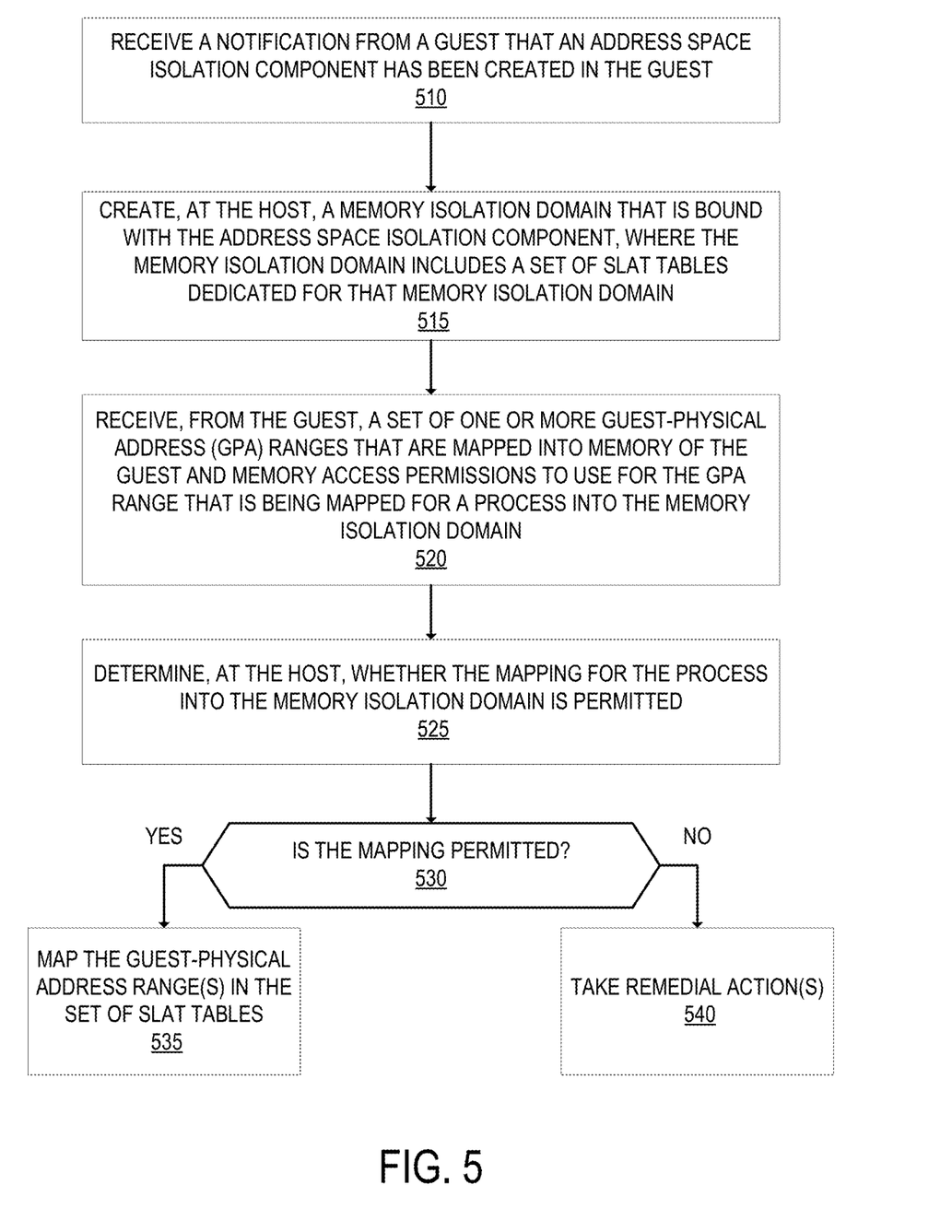
FIG. 5 is a flow diagram that illustrates exemplary operations for performing physical memory isolation according to an embodiment.

FIG. 5 is a flow diagram that illustrates exemplary operations for performing physical memory isolation according to an embodiment. The operations of FIG. 5 are described with respect to the exemplary embodiment of FIGS. 1 and 2. However, the exemplary embodiments of FIGS. 1 and 2 can perform operations different from the operations of FIG. 5, and the operations of FIG. 5 can be performed by embodiments different from the embodiments of FIGS. 1 and 2. In the operations of FIG. 5, the host does not track VMA of the guest.

At operation 510, the host receives a notification from the guest in the virtualized system that an address space isolation component has been created in the guest. For example, the kernel of the guest operating system 109 creates an address space isolation component 233 and communicates the creation of the address space isolation component 233 to the host that is received at the memory isolation module 114. The communication may be a hypercall using the hypercall interface 242 and may identify the created address space isolation component 233. The kernel of the guest may create the address space isolation component 233 responsive to a fork function being executed with flags to indicate the allocation of the address space isolation component.

Next, at operation 515, the host of the virtualized system creates a memory isolation domain 246 (e.g., the VMM 115 creates a memory isolation domain 246) that is bound with the created address space isolation component 233. The memory isolation domain 246 includes a set of SLAT tables dedicated for that memory isolation domain 246. The set of SLAT tables may be initially empty with the exception that the VMM 115 may partially populate the SLAT tables with mappings that are required by the hardware (e.g., MMIO regions). The host may also return an identifier of the memory isolation domain 246 to the guest. This identifier can be used by the guest to identify the memory isolation domain 246 in subsequent communications.

Next, at operation 520, the host receives, from the guest, a set of one or more GPA ranges that are mapped into memory of the guest, and receives memory access permissions to use for the GPA range that is being mapped for a process into the created memory isolation domain. The maintains multiple memory isolation domains and GPA mappings, including memory access permissions, for each of the memory isolation domains. The guest may use a hypercall through the hypercall interface 242 to instruct the host to map the GPA range(s) for the process into the memory isolation domain. The guest may also use a hypercall through the hypercall interface 242 to communicate the memory access permissions to use for the GPA range. As an alternative to receiving the GPA mappings explicitly through hypercalls, the host may configure the guest to trap on a SLAT violation for communicating the GPA ranges and their permissions (e.g., because there is no GPA mappings in the SLAT or the permissions are restricted).

Next, at operation 525, the host determines whether the mapping for the process into the memory isolation domain is permitted. The host accesses the stored GPA mappings when determining whether the mapping is permitted. The host may perform one or more of the following when determining whether the mapping is permitted. First, if the host did not yet map the requested GPA range into any memory isolation domain (which means that the memory belongs to the "kernel/system" and is not currently assigned to any memory isolation domain), the host will map the GPA range into the memory isolation domain (e.g., add an entry in the SLAT tables for the memory isolation domain) and mark the GPA range as "exclusive" to the memory isolation domain. A guest-physical page can be marked as "exclusive" to a particular memory isolation domain by granting write permissions to that guest-physical page. An exclusive physical page is a page that belongs to a single memory domain and cannot be shared with other domains. Second, if the host has already mapped this GPA range with different permissions inside of the same memory isolation domain, the host grants (and if necessary extends) the previously granted permissions in this memory isolation domain. Third, if the host has already mapped this GPA range with the same permissions inside a different memory isolation domain, the host will mark the GPA range as "shared across domains" and grant the mapping. A shared physical page is a page that is permitted to be mapped into multiple memory isolation domains. In an embodiment, the host allows pages to be shared only if the pages are not writable in any memory isolation domain. The host will block or take other remedial action for all other access/mapping attempts. For instance, the host will not map the GPA range in the SLAT tables for the memory isolation domain. As an example, if the host has already mapped this GPA range with different permissions inside a different memory isolation domain, the host will block the access.

Thus, at operation 530, if the mapping is permitted, then at operation 535 the host maps the guest-physical address range(s) in the set of SLAT tables for the memory domain. If the mapping is not permitted, then at operation 540 the host takes one or more remedial actions (e.g., block and/or log the access attempt).

The exemplary architecture shown in the Figures can be used in different hardware architectures including ARM architectures and x86 architectures. ARM defines different levels of privilege as exception levels. Each exception level is numbered, and the higher levels of privilege have higher numbers. Exception level 0 (EL0) is known as the application privilege level. All the hypervisor components except for the microkernel 160 are in the exception level 0. Applications executing within the virtual machines are also in exception level 0. The OS kernels executing within the virtual machines are in exception level 1 (EL1), which is the rich OS exception level. The microkernel 160 is in exception level 2 (EL2), which is the hypervisor privilege level. The firmware 178 and the hardware 180 are at exception level 3 (EL3), which is the firmware privilege level and the highest privilege level. The x86 architecture defines four protection rings but most modern architectures use two privilege levels, rings 0 and 3 and may run in guest or host mode. For instance, a guest OS kernel running in a virtual machine runs in the most privileged level (guest kernel mode, ring 0), and the guest applications run in a lesser privileged level (guest user mode, ring 3). The microkernel 160 runs in the most privileged level of the host (host kernel mode, ring 0), and the other components of the hypervisor run in a lesser privileged level (host user mode, ring 3).

Multiple components of the virtualization layer are formally verified components in some embodiments. Formal verification proves (or disproves) the correctness of intended code using formal methods of mathematics. Formal verification guarantees that a system is free of programming errors.

The techniques shown in the figures can be implemented using code and data stored and executed on one or more computing devices. Such computing devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such computing devices typically include a set of one or more hardware processors coupled to one or more other components, such as one or more I/O devices (e.g., storage devices (non-transitory machine-readable storage media), a keyboard, a touchscreen, a display, and/or network connections). The coupling of the set of processors and other components is typically through one or more busses and bridges (also termed as bus controllers). Thus, the storage device of a given computing device typically stores code and/or data for execution on the set of one or more processors of that computing device.

In the preceding description, numerous specific details are set forth to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the preceding description and the claims, the terms "coupled" and "connected," along with their derivatives, may be used. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

While the flow diagrams in the figures show a particular order of operations performed by certain embodiments of the invention, such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for physical memory isolation in a virtualized system, comprising:
    receiving a notification from a guest in the virtualized system that an address space isolation component has been created in the guest;
    creating, at a host of the virtualized system, a memory isolation domain that is bound with the address space isolation component, wherein the memory isolation domain includes a set of second level address translation (SLAT) tables dedicated for that memory isolation domain;
    receiving, from the guest, a set of one or more guest-physical address (GPA) ranges that are mapped into memory of the guest and receiving memory access permissions to use for the GPA range that is being mapped for a process into the created memory isolation domain, wherein the host maintains multiple memory isolation domains and GPA mappings for each of the memory isolation domains;
    determining, at the host, whether the mapping for the process into the created memory isolation domain is permitted;
    responsive to determining that the mapping for the process is not permitted, blocking the mapping thereby preventing access; and
    responsive to determining that the mapping for the process is permitted, granting the mapping and thereby allowing access.

2. The method of claim 1, wherein determining that the mapping for the process is permitted includes determining that the set of GPA ranges is not currently mapped to any of the memory isolation domains of the virtualized system.

3. The method of claim 1, wherein determining that the mapping for the process is permitted includes determining that the set of GPA ranges is already mapped with different memory access permissions inside of the memory isolation bound that is bound with the address space isolation component.

4. The method of claim 1, wherein determining that the mapping for the process is permitted includes determining that the set of GPA ranges is mapped with a same memory access permissions inside a different memory isolation domain from the memory isolation domain that is bound with the address space isolation component.

5. The method of claim 1, wherein determining that the mapping for the process is not permitted includes determining that none of the following conditions exist:
    the set of GPA ranges is not currently mapped to any of the memory isolation domains of the virtualized system;
    the set of GPA ranges is already mapped with different memory access permissions inside of the memory isolation bound that is bound with the address space isolation component; and
    the set of GPA ranges is mapped with a same memory access permissions inside a different memory isolation domain from the memory isolation domain that is bound with the address space isolation component.

6. The method of claim 1, wherein the host does not track virtual memory area (VMA) region of the guest.

7. A computing device that implements a virtualized system, comprising:
    a processor; and
    a non-transitory machine-readable storage medium that provides instructions that, if executed by the processor cause the computing device to perform operations including:
        receiving a notification from a guest in the virtualized system that an address space isolation component has been created in the guest;
        creating, at a host of the virtualized system, a memory isolation domain that is bound with the address space isolation component, wherein the memory isolation domain includes a set of second level address translation (SLAT) tables dedicated for that memory isolation domain;
        receiving, from the guest, a set of one or more guest-physical address (GPA) ranges that are mapped into memory of the guest and receiving memory access permissions to use for the GPA range that is being mapped for a process into the created memory isolation domain, wherein the host maintains multiple memory isolation domains and GPA mappings for each of the memory isolation domains;
        determining, at the host, whether the mapping for the process into the created memory isolation domain is permitted;
        responsive to determining that the mapping for the process is not permitted, blocking the mapping thereby preventing access; and
        responsive to determining that the mapping for the process is permitted, granting the mapping and thereby allowing access.

8. The computing device of claim 7, wherein determining that the mapping for the process is permitted includes determining that the set of GPA ranges is not currently mapped to any of the memory isolation domains of the virtualized system.

9. The computing device of claim 7, wherein determining that the mapping for the process is permitted includes determining that the set of GPA ranges is already mapped with different memory access permissions inside of the memory isolation bound that is bound with the address space isolation component.

10. The computing device of claim 7, wherein determining that the mapping for the process is permitted includes determining that the set of GPA ranges is mapped with a same memory access permissions inside a different memory isolation domain from the memory isolation domain that is bound with the address space isolation component.

11. The computing device of claim 7, wherein determining that the mapping for the process is not permitted includes determining that none of the following conditions exist:
the set of GPA ranges is not currently mapped to any of the memory isolation domains of the virtualized system;
the set of GPA ranges is already mapped with different memory access permissions inside of the memory isolation bound that is bound with the address space isolation component; and
the set of GPA ranges is mapped with a same memory access permissions inside a different memory isolation domain from the memory isolation domain that is bound with the address space isolation component.

12. The computing device of claim 7, wherein the host does not track virtual memory area (VMA) region of the guest.

13. A non-transitory machine-readable storage medium that provides instructions that, if executed by a processor of a computing device that implements a virtualized system, will cause the computing device to perform operations including:
receiving a notification from a guest in the virtualized system that an address space isolation component has been created in the guest;
creating, at a host of the virtualized system, a memory isolation domain that is bound with the address space isolation component, wherein the memory isolation domain includes a set of second level address translation (SLAT) tables dedicated for that memory isolation domain;
receiving, from the guest, a set of one or more guest-physical address (GPA) ranges that are mapped into memory of the guest and receiving memory access permissions to use for the GPA range that is being mapped for a process into the created memory isolation domain, wherein the host maintains multiple memory isolation domains and GPA mappings for each of the memory isolation domains;
determining, at the host, whether the mapping for the process into the created memory isolation domain is permitted;
responsive to determining that the mapping for the process is not permitted, blocking the mapping thereby preventing access; and
responsive to determining that the mapping for the process is permitted, granting the mapping and thereby allowing access.

14. The non-transitory machine-readable storage medium of claim 13, wherein determining that the mapping for the process is permitted includes determining that the set of GPA ranges is not currently mapped to any of the memory isolation domains of the virtualized system.

15. The non-transitory machine-readable storage medium of claim 13, wherein determining that the mapping for the process is permitted includes determining that the set of GPA ranges is already mapped with different memory access permissions inside of the memory isolation bound that is bound with the address space isolation component.

16. The non-transitory machine-readable storage medium of claim 13, wherein determining that the mapping for the process is permitted includes determining that the set of GPA ranges is mapped with a same memory access permissions inside a different memory isolation domain from the memory isolation domain that is bound with the address space isolation component.

17. The non-transitory machine-readable storage medium of claim 13, wherein determining that the mapping for the process is not permitted includes determining that none of the following conditions exist:
the set of GPA ranges is not currently mapped to any of the memory isolation domains of the virtualized system;
the set of GPA ranges is already mapped with different memory access permissions inside of the memory isolation bound that is bound with the address space isolation component; and
the set of GPA ranges is mapped with a same memory access permissions inside a different memory isolation domain from the memory isolation domain that is bound with the address space isolation component.

18. The non-transitory machine-readable storage medium of claim 13, wherein the host does not track virtual memory area (VMA) region of the guest.

* * * * *